(12) United States Patent
deBlanc et al.

(10) Patent No.: US 6,910,089 B2
(45) Date of Patent: Jun. 21, 2005

(54) FAULT TOLERANT BUS FOR HIGHLY AVAILABLE STORAGE ENCLOSURE

(75) Inventors: James J. deBlanc, Roseville, CA (US); Carl R. Haynie, Pilot Hill, CA (US); James L. White, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 413 days.

(21) Appl. No.: 09/872,924

(22) Filed: Jun. 1, 2001

(65) Prior Publication Data

US 2003/0028698 A1 Feb. 6, 2003

(51) Int. Cl.$^7$ .............................................. G06F 13/14
(52) U.S. Cl. ........................................ 710/305; 326/30
(58) Field of Search ................................ 710/305, 100, 710/107, 302; 324/754; 326/30, 86; 365/63; 327/141, 108; 333/1; 361/774; 375/257; 307/42; 439/404; 174/117 R

(56) References Cited

U.S. PATENT DOCUMENTS

| | | | | |
|---|---|---|---|---|
| 4,445,048 A | * | 4/1984 | Graham ....................... | 307/42 |
| 5,019,728 A | * | 5/1991 | Sanwo et al. ................. | 326/86 |
| 5,046,072 A | * | 9/1991 | Shimizu et al. .............. | 375/257 |
| 5,224,021 A | * | 6/1993 | Takada et al. ............... | 361/774 |
| 5,382,841 A | * | 1/1995 | Feldbaumer ................. | 326/30 |
| 5,564,024 A | * | 10/1996 | Pemberton .................. | 710/302 |

(Continued)

FOREIGN PATENT DOCUMENTS

EP 0674274 A 9/1995

OTHER PUBLICATIONS

H. Bogenrieder, "Common Bosch Siemens Temic Bus Description, Rev. 2.00", (Apr. 24, 2001) (see, e.g., par. 2.5.1; Fig. 12).

SFF Committee, "SFF–8046 Specification for 80-pin SCA–2 Connector for SCSI Disk Drives—Rev. 2.7", Oct. 3, 1996.

SFF Committee, "SFF–8410 Specification for HSS Copper Testing and Performance Requirements–Rev. 16.1", Mar. 20, 2000.

Primary Examiner—Mark H. Rinehart
Assistant Examiner—Christopher E. Lee

(57) ABSTRACT

A backplane apparatus for an electronic device enclosure includes a common bus comprising a plurality of signal lines, each signal line having a current limiting element, RA. Isolation circuitry is provided for electrically coupling each of the plurality of signal lines of the common bus to a corresponding plurality of signal lines of the electronic device to enable signal communication between the common bus and the electronic device through the isolation circuitry. In one embodiment, the backplane apparatus further comprises connectors to enable removably attaching the electronic devices such as disk drives. In one embodiment, the isolation circuitry coupling each signal line of the common bus to the connector comprises an inline resistor, RD. The isolation circuitry associated with some of the signal lines may include pull up resistors. The values of RA and RD are selected to ensure that the common bus meets pre-determined current and voltage requirements so that the common bus can change states even if one or more of the devices fail by shorting to ground.

17 Claims, 5 Drawing Sheets

U.S. PATENT DOCUMENTS

| | | | |
|---|---|---|---|
| 5,568,060 A | | 10/1996 | Bartholomay et al. |
| 5,568,063 A | * | 10/1996 | Takekuma et al. ............. 326/30 |
| 5,572,685 A | * | 11/1996 | Fisher et al. ................. 710/107 |
| 5,612,634 A | | 3/1997 | MacKenna |
| 5,620,331 A | * | 4/1997 | Los et al. ................... 439/404 |
| 5,663,661 A | * | 9/1997 | Dillon et al. ................. 326/30 |
| 5,721,497 A | * | 2/1998 | Novak .......................... 326/30 |
| 5,767,695 A | | 6/1998 | Takekuma et al. |
| 5,945,886 A | * | 8/1999 | Millar ........................... 333/1 |
| 5,955,703 A | * | 9/1999 | Daly et al. .............. 174/117 R |
| 6,011,710 A | * | 1/2000 | Wiggers ....................... 365/63 |
| 6,140,850 A | * | 10/2000 | Inoue .......................... 327/141 |
| 6,222,389 B1 | * | 4/2001 | Williams ...................... 326/86 |
| 6,297,663 B1 | * | 10/2001 | Matsuoka et al. ............. 326/30 |
| 6,369,605 B1 | * | 4/2002 | Bonella et al. ................ 326/30 |
| 6,434,647 B1 | * | 8/2002 | Bittner, Jr. ................... 710/100 |
| 6,531,901 B2 | * | 3/2003 | Kamiya ....................... 327/108 |
| 6,603,323 B1 | * | 8/2003 | Miller et al. ................. 324/754 |
| 2001/0035768 A1 | * | 11/2001 | Garlepp et al. ............... 326/30 |

\* cited by examiner

FAULT TOLERANT BUS FOR HIGHLY AVAILABLE STORAGE ENCLOSURE

FIELD OF THE INVENTION

This invention relates to the field of bus architecture. In particular, this invention is drawn to a fault tolerant bus architecture.

BACKGROUND OF THE INVENTION

High capacity mass storage subsystems are typically made up of a plurality of storage devices such as disk drives to minimize the extent of data loss in the event of failure of a single device. Such an organization also aids throughput by distributing the location of the data across multiple storage devices. Some systems deliberately distribute the data and error correction codes across multiple storage devices in ways that permit full recovery of the data even if one or more of the devices fails.

The storage arrays are designed so that groups of storage devices share the same backplane. The backplane or midplane connects common signals such as power, control, or data lines to each storage device. The backplane typically also connects the storage devices to input/output controller cards.

When the storage device fails mechanically, the failed device does not interfere with the operation of the remaining devices. When a common bus is used to distribute electrical signals, however, the failure of a single drive may place the common bus in an undesirable latched state which renders the remaining drives inaccessible or otherwise results in loss of control of the remaining drives. In order to avoid the risk of a single electrical failure affecting all devices connected to a controller card on the same backplane, individual signal lines may be used for each storage device.

For example, each device may be connected to the I/O controller card with its own control line. This requires a dedicated connector pin or signal line on the I/O controller card for each control line and the I/O controller must drive each line separately. If a drive fails, then other drives would be unaffected.

One disadvantage of this approach is that the architecture is not readily scalable. In an enclosure with 15 devices and 8 control signal lines per device, 120 distinct control signal lines per I/O controller card would be required. The large number of distinct control signal lines add cost and complexity to the realization of the storage array as well as the I/O controller card.

SUMMARY OF THE INVENTION

In view of limitations of known systems and methods, methods and apparatus for providing fault tolerant busses for attaching and communicating with multiple electronic devices are disclosed. A backplane apparatus includes a common bus for carrying a plurality of signals. Each signal line of the common bus has a current limiting element, RA. The backplane further includes isolation circuitry for electrically coupling each of the plurality of signal lines of the common bus to an electronic device through the isolation circuitry. In one embodiment, the electronic device is removably attached to the backplane signal lines through a connector. In one embodiment, the isolation circuitry includes an inline resistor, RD, coupling at least one signal line from the common bus to the electronic device. The isolation circuitry association with some signal lines may further comprise pull up resistors. The values of RA and RD are selected to ensure that the common bus meets pre-determined current and voltage in order to change states despite the shorting of one or more of the electronic devices inputs to ground. The fault tolerant bus design permits failure of one or more attached electronic devices such as disk drives without inhibiting the ability of the bus to change states.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
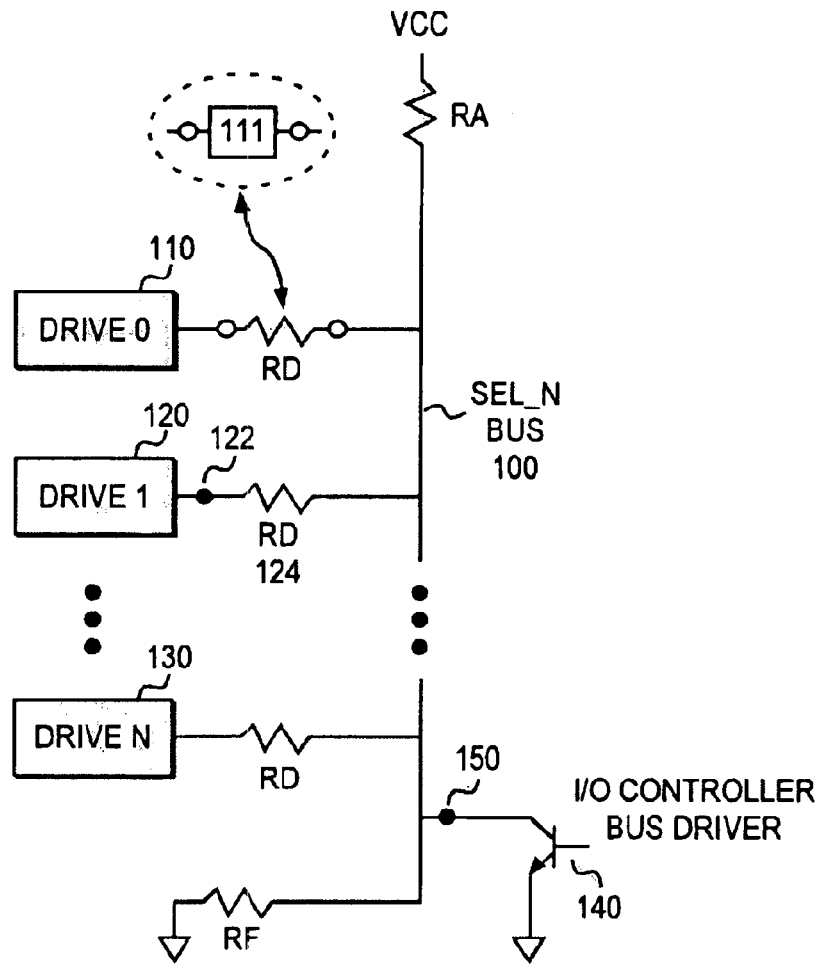
FIG. 1 illustrates one embodiment of a method of isolating individual drive signal lines sufficiently from a common bus to prevent electrical failure of a single device from substantially interfering with communications on the common bus to the remaining drives.

Disk drive storage arrays typically comprise a plurality of individual disk drives housed in a common storage enclosure. The disk drives are removable so that drives may be exchanged for maintenance or in the event that a drive fails. Control, address, and data signals are provided to the drives via midplanes or backplanes. In one embodiment, the disk drives have connectors that permit removably connecting the disk drives to a common backplane for communication of these signals between the disk drives and an I/O controller card.

The Small Form Factor (SFF) Committee develops and promulgates standards for the storage industry including standards related to the physical specifications of the connectors and the function of the individual connector pins depending upon the protocol. Standards for popular connectors include "40-pin SCA-2 Connector w/Parallel Selection" (SFF-8045), "80-pin SCA-2 Connector for SCSI Disk Drives" (SFF-8046), "40-pin SCA-2 Connector w/Serial Selection" (SFF-8047), and "80-pin SCA-2 Connector w/Parallel ESI" (SFF-8048). "SCA" refers to a Single Connector Attachment which is a type of disk drive connector that includes pins for electrical power as well as data and control signals.

SCA connectors may support a number of different protocols. SFF-8045, for example, defines a single connector suitable for the direct attachment of Fibre Channel drives to backplanes or motherboards. Fibre Channel serves as a general transport vehicle to deliver the command sets of several existing interface protocols including SCSI, IPI-3, HIPPI-FP, IP, and ATM/AAL5.

A number of pins on Fibre Channel compatible disk drives are devoted to drive control. For example, the drive address (SEL_n, 7 bits), spin-up control (START_n, 2 bits), and device control (DEV_CTRL_CODE_n, 3 bits) represent 12 individual control lines needed for a single Fibre Channel compatible drive. If independent control lines rather than bussed control lines are used for every drive as a failsafe precaution, the number of high speed interconnects required to support more than a small number of drives becomes burdensome. For 15 drives, 180 separate interconnects (i.e., 180 signal lines) per I/O controller card are required just for the control signals. This represents a significant pin count when pin-type connectors are used.

Some reduction in required line count may be realized by hard wiring interconnects HIGH or LOW, when dynamic control is not required. A 15 drive enclosure, for example, does not require 7 bits to enable unique identification of each drive. Even if 4 control lines could be set HIGH or LOW, this would result in a reduction of only 60 signal lines. The I/O controller is still required to support a relatively large line count of 120 signal lines for the remaining control lines. Moreover, if redundant I/O controllers are used, all 120 signal lines must be individually bussed to both I/O controllers.

Although the control signals could share a common bus across all drives to reduce the count of completely distinct signal lines, several specifications such as the SFF-8045 40-pin SCA-2 Connector w/Parallel Selection, and SFF-8046 80-pin SCA-2 Connector for SCSI Disk Drives discourage bussing any signals that must be in the high state (or capable of being switched to the high state) across multiple drives. This protects the other drives in the event a drive on the common bus fails or is powered down. The standards suggest that each drive should have these signals independently supplied to ensure proper operation. If the signals were bussed to several drives, then a drive with a power failure or other electrical failure may clamp the signals in a condition that causes otherwise operational drives to behave incorrectly.

The SFF specifications define the SCA connector pin and signal assignments as well as the current and voltage relationship requirements for the signals carried by the SCA connector. Different operational constraints apply depending upon whether the drive signal lines have pull up resistors.

For example, the SEL_n control lines do not have pull up resistors. The operational constraints for the HIGH and LOW states of the SEL_n control lines are set forth in Table 1 as follows:

TABLE 1

| STATE | CURRENT | VOLTAGE |
|-------|---------|---------|
| HIGH  | −20 µA < Iih < 20 µA | 2.2 V < Vih < 5.25 V |
| LOW   | −20 µA < Iil < 20 µA | −0.5 V < Vil < 0.7 V |

The START_x/MATED signals are specified to have pull up resistors. Table 2 defines the operational constraints for the HIGH and LOW states of the START_x/MATED signals as follows:

TABLE 2

| STATE | CURRENT | VOLTAGE |
|-------|---------|---------|
| HIGH  | −20 µA < Iih < 20 µA | 2.2 V < Vih < 5.25 V |
| LOW   | 0 µA < Iil < 1 mA   | −0.5 V < Vil < 0.7 V |

FIG. 1 illustrates an isolation technique for the bussed signals. Instead of providing individual control signals to each drive, the signals are provided from a common bus to each of driver 110–130 through an isolation resistor, RD. In this embodiment a single isolation resistor, RD couples each drive to a stub coupled to the common bussed signal. Resistor 124 is a passive component. In an alternative embodiment, active circuitry component 111 is used for isolation. The illustrated bussed signal 100 is one of the SEL_N signal lines.

Resistor RF models the bus load resulting from one or more drives with an input shorted to ground. Each such drive effectively places its associated RD in parallel with the isolation resistors of other failed drives. Thus $$RF \approx \frac{RD}{n},$$

where n is the number of failed drives.

The bus 100 is connected to an open collector (or open drain) driver indicated by driver transistor 140. Contrary to the various SFF specifications, the control signals can be bussed to all the drives using a common bus rather than individual signal lines, if RA and RD can be selected to ensure compliance with the current and voltage operational constraints even in the presence of one or more failed drives. Note that RA limits the total current through the common bus. Thus there is one RA for each signal line commonly used, but there is an individual inline RD for each device coupled to the common bus. Although illustrated as a passive component (e.g., resistor) in FIG. 1, the current limiting element embodied as RA may be implemented using active circuitry in other embodiments.

When driver transistor 140 pulls bus 100 to the LOW state, driver transistor 140 is saturated. Accordingly, the voltage at node 150 is approximately 0.2 V. The maximum voltage at any selected drive input node 122 is specified not to exceed 0.7 V. Accordingly a maximum value for any RD 124 when the bus is in the low state is calculated as follows:

$$RD_{max} = \frac{0.7 - 0.2 \text{ V}}{20 \text{ µA}},$$

thus yielding a maximum value for RD of approximately 25 KΩ for the LOW input state. There is no minimum value of RD for the LOW state.

Figure 2:
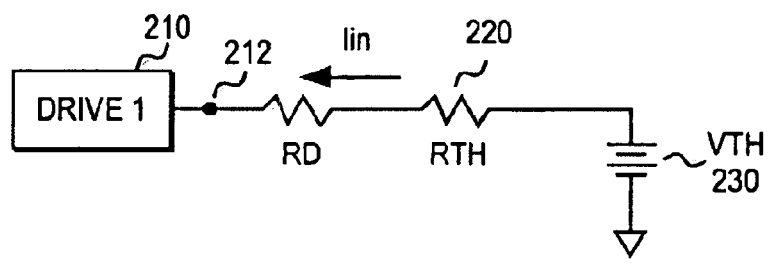
FIG. 2 illustrates a circuit model of the signal path from the bus driver to a single drive for the bus HIGH state.

FIG. 2 illustrates a Thévenin equivalent model of the bussed signal to a single selected drive 210 for the HIGH state. The input HIGH state is affected by shorted drives. Referring to FIGS. 1 and 2, VTH 230 and RTH 220 correspond to a Thévenin equivalent circuit for VCC, RA, and RE. VTH corresponds to the voltage at node 150. In the failed HIGH state, the values of RTH and VTH are determined as follows:

$$RTH = RA \cdot \frac{RF}{RA + RF}$$

$$VTH = VCC \cdot \frac{RF}{RA + RF}$$

The input voltage, Vin, at node 212 (122) is determined as follows:

$$V_{in} = VTH - I_{inmax} \cdot (RD + RTH)$$

For the HIGH state, worst cases conditions occur when the disk drive input current reduces the pull up voltage. In a worst case loading condition, the minimum permitted Vin=2.2 V.

For the HIGH state, the value for RD should be large enough to provide good immunity to other drive inputs failing to ground. The value for RA should be low enough to enable keeping the bus high even if multiple drives are faulted to ground. Although substantial flexibility exists with respect to the selection of RA and RD, the total pull up resistance (RA+RD) should not be less than 3.3 KΩ because of requirements in the SFF-8045 specification. In addition, lower RA values impose greater current handling capabilities for bus driver 140. The power supply voltage will obviously affect choices for RA and RD. In one embodiment, VCC is approximately 5 V. Values for RA and RD are selected as

RA=470Ω

RD=2900Ω

Figure 3:
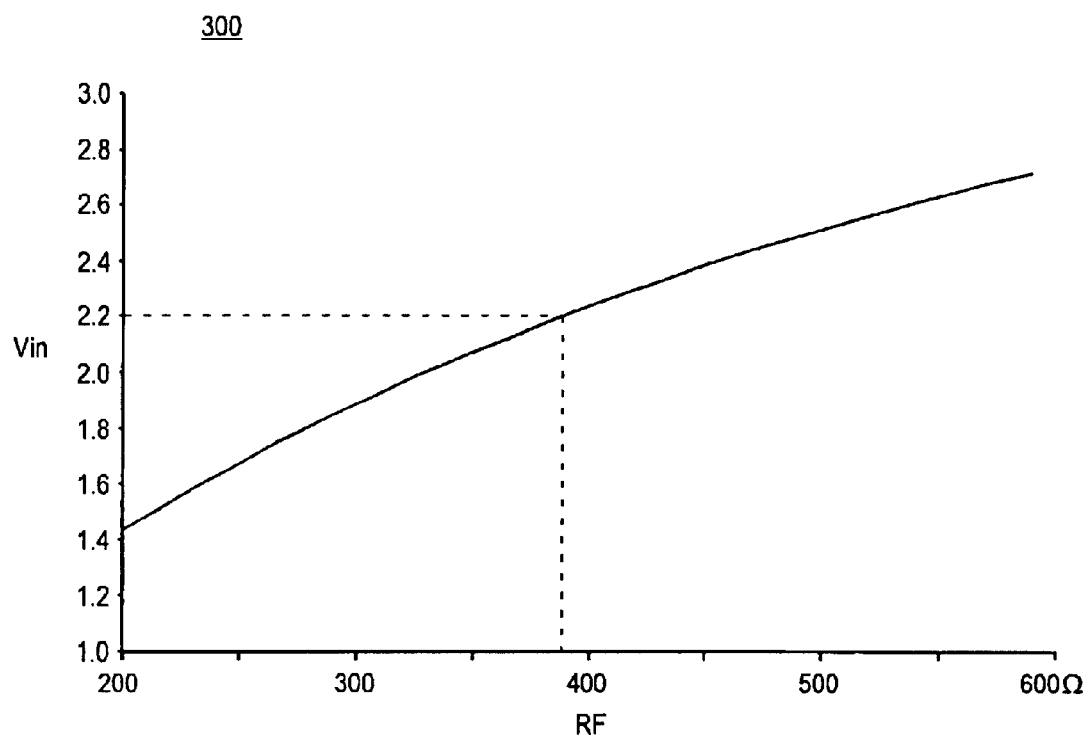
FIG. 3 illustrates the input voltage to the single disk drive for pre-determined isolation circuit values vs. the failed drive impedance.

Chart 300 of FIG. 3 illustrates Vin vs. RF based on this particular combination of VCC, RA, and RD. The RF for the minimum Vin (2.2 V) required to sustain the HIGH state is approximately 390Ω. Multiple shorted drives effectively places resistors, RD, for those drives in parallel. This corresponds to approximately 7 shorted drives $$\left( INT\left(\frac{2900}{390}\right) = 7 \right).$$

Additional shorted devices would not allow Vin to meet or exceed the minimum threshold required for the HIGH state. For a 15 drive array, this still reflects sufficient isolation to accommodate a failure of almost half of all the drives. The designer has the freedom to select the appropriate values to accommodate fewer or additional failures depending upon the desired system robustness.

RD may be increased up to the limit established by the LOW state (i.e., 25 KΩ) in order to accommodate a higher failure rate. Increasing RD introduces noise and thus reduces the noise immunity for each signal line. Nonetheless, an increase in RD from 2900Ω to approximately 5800Ω would provide sufficient isolation to accommodate failure of 14 drives. Of course, the ultimate purpose of the device array may be frustrated if so many devices have failed. Nonetheless, the bus will be able to switch between the HIGH and LOW states despite the number of failures.

The device driving the bus (e.g., transistor 140) must be capable of handling the total current. Referring to FIG. 1, transistor 140 must handle the total current defined by:

$$I_{TOTAL} = \frac{VCC - V_{150}}{RA} + n \cdot I_{inmax}$$

For a 15 drive array, $I_{TOTAL}$ is calculated as follows:

$$I_{TOTAL} = \frac{5.0 \text{ V} - 0.2 \text{ V}}{470 \text{ }\Omega} + 15 \cdot 20 \text{ }\mu A \approx 11 \text{ ma}$$

Figure 4:
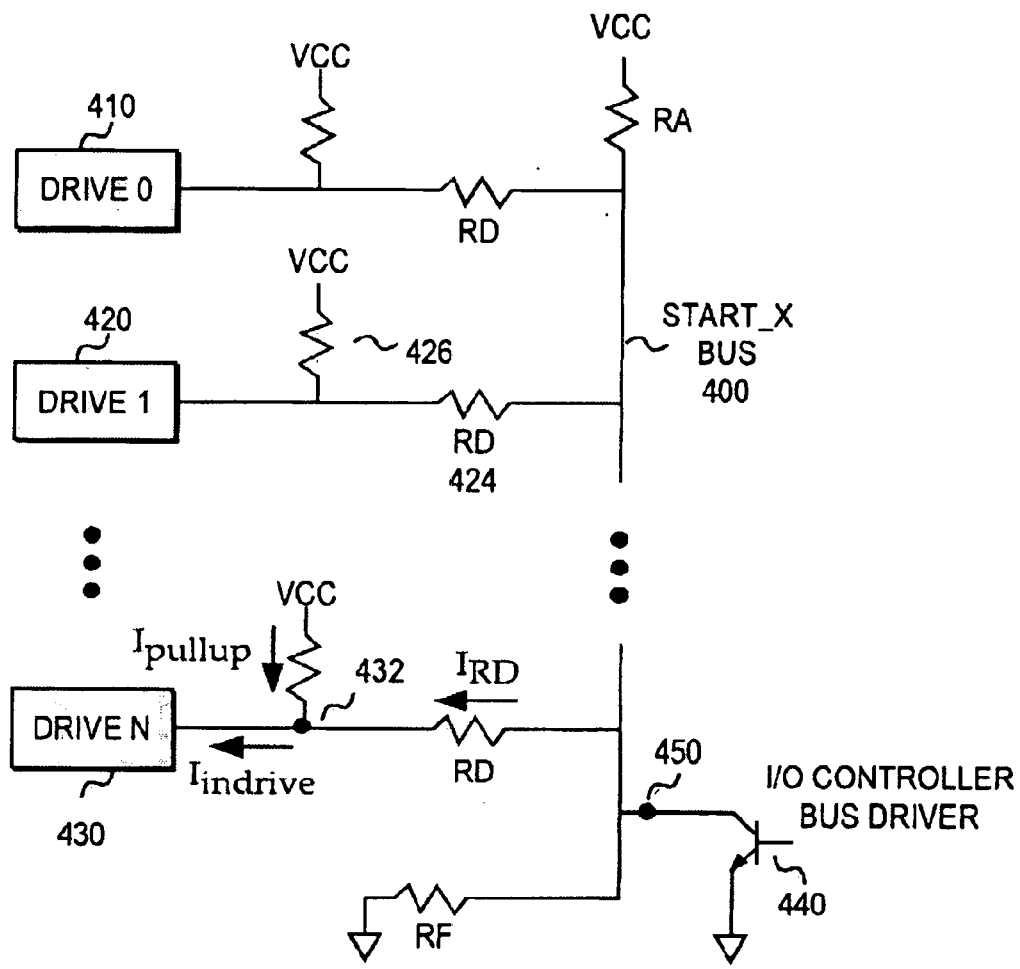
FIG. 4 illustrates one embodiment of a method of isolating individual drive signal lines with pull up resistors sufficiently from a common bus to prevent electrical failure of a single device from substantially interfering with communications on the common bus to the remaining drives.

FIG. 4 illustrates one embodiment of a method of isolating individual drive signal lines with pull up resistors sufficiently from a common bus to prevent electrical failure of a single device from substantially interfering with communications on the common bus to the remaining drives. Drives 410–430 are coupled to a common START_x signal line 400 driven by an open collector (drain) drive transistor 440. The input of each drive 420 has an associated pull up resistor 426. SFF 8045 specifies a value of 10 KΩ for the pull up resistors. Each selected drive input signal line is coupled to the START_x signal line 400 through a resistor RD 424. RF represents the bus load due to one or more failed drives.

When the bus 400 is LOW, the drive input voltage is determined by a voltage divider consisting of VCC, the pull up resistor, and RD. For a selected drive 420, the associated inline resistor RD 424 must be low enough to guarantee that Vin<0.7 V when bus 400 is in the LOW state.

The currents and voltages are illustrated with respect to drive 430 for analysis. The maximum value for resistor RD is determined as follows:

$$RD = \frac{V_{432} - V_{450}}{I_{RD}}$$

$V_{450}$ is approximately 0.2 V when the bus 400 is in a LOW state because drive transistor 440 is saturated. RD is determined by the minimum Vin low voltage level (0.7 V from Table 2), worst case $V_{CC}$ (5.25 V), worst case $I_{in}$ for the drive, and some level of noise margin.

$V_{in}$ corresponds to the voltage at node 432. Assuming a 300 mV noise margin, the minimum $V_{in}$ ($V_{432}$) is 0.4 V (0.7–0.3). $I_{RD}$ is calculated as follows:

$$I_{RD} = \frac{V_{CC} - V_{432}}{R_{pullup}} + I_{in}$$

Substitution from Table 2 yields RD=396Ω with a 10KΩ pull up resistor. A standard resistor value of 383Ω, 1% tolerance ensures that the minimum $V_{in}$ can be sustained.

Figure 5:
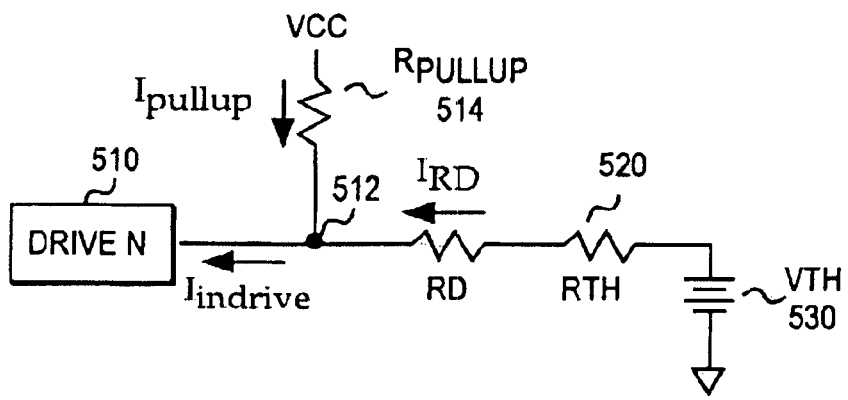
FIG. 5 illustrates a circuit model of the signal path from the bus driver to a single drive for the bus HIGH state for signal lines with pull up resistors.
Figure 6:
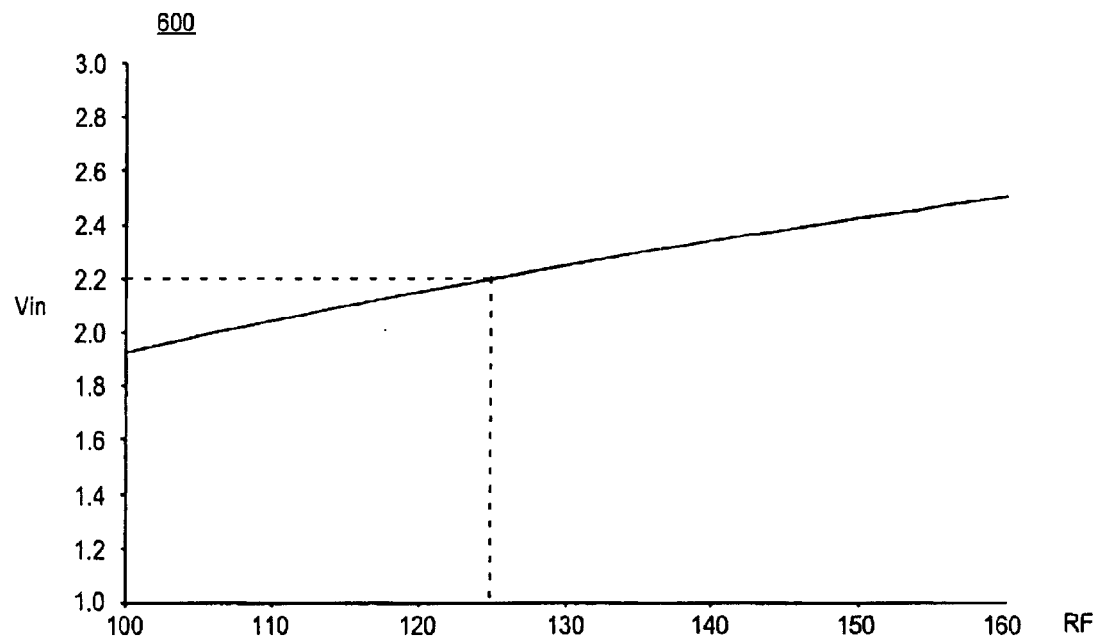
FIG. 6 illustrates the input voltage to the single disk drive with pull up resistors for pre-determined isolation circuit values vs. the failed drive impedance.

FIG. 5 illustrates a circuit model of the signal path from the bus driver to a single drive with a pull up resistor for the bus HIGH state. Referring to FIGS. 4–5, VTH 530 and RTH 520 form a Thévenin equivalent circuit for $V_{CC}$, RA, and RF. Vin for the drive is calculated as $$V_{in} = \frac{(V_{CC} - R_{pullup} \cdot I_{in})(RD + RTH) + R_{pullup} \cdot VTH}{R_{pullup} + RD + RTH}$$

Again the designer has the freedom to select the appropriate values for RA and RD to accommodate a level of robustness that the designer sees fit. In one embodiment, RA is selected to be approximately 158Ω. (This is readily realized through the use of standard value resistors such as two 316Ω resistors in parallel). RF is selected to not fall below 128Ω to ensure adequate Vin. Approximately 3 drives can be shorted $$\left( \frac{383}{128} \approx 3 \right)$$

while still maintaining Vin>2.2 V.

Clearly the values selected for RD and RA depend upon a number of factors including the specified operational constraints, VCC, and whether a pullup resistor is used. Exemplary systems might select RD in a range of approximately 1 KΩ to 25 KΩ for typical VCC values and no pullup resistor. With a pullup resistor, RD would typically have a value less than 1 KΩ. RA likewise varies based on the values for RD, VCC, the specified operational constraints, current switching capabilities of the bus drivers, and whether pullup resistors are used. In various embodiments, RA is selected to have values in a range of 10Ω to 5 KΩ depending upon whether pullup resistors are used.

Figure 7:
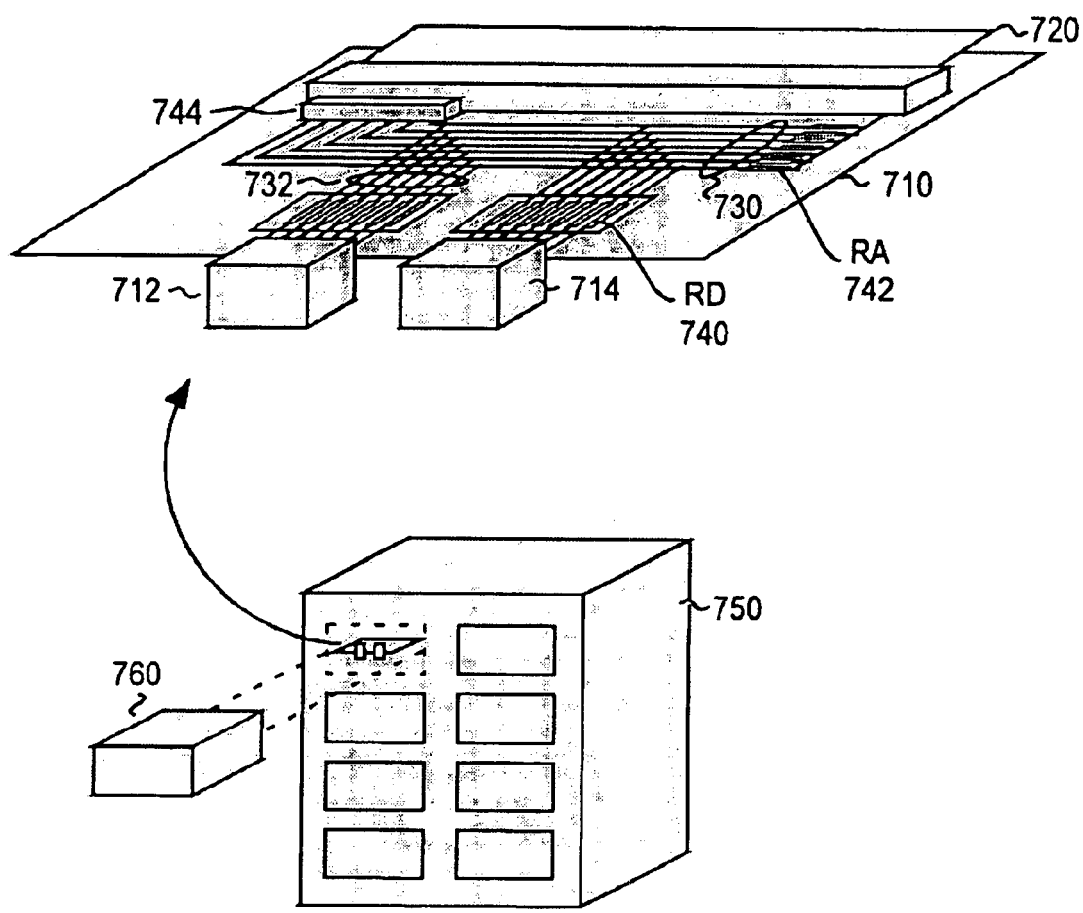
FIG. 7 illustrates a device enclosure including a backplane with isolation circuitry.

FIG. 7 illustrates one embodiment of a device array storage enclosure 750 with one or more backplanes 710 having a fault tolerant common signal bus 730 for communicating with devices 760 with or without input pullup resistors. The common signal bus 730 is illustrated without pullup resistors. Every signal line commonly bussed (e.g., each signal line of common bus 730) has a current limiting component RA 742 shared by all devices connected to that signal line. An individual resistor RD 740 is provided for each device connected to each commonly bussed signal line. The bus driver 744 is used to drive the bus state and thus communicate HIGH or LOW control signals to the attached devices.

The backplane may be connected to an input/output card such as controller card 720. The backplane is provided with a plurality of connectors 712, 714 to enable connecting a device 760 such as a disk drive to the backplane and the associated common bus 730. The individual signal lines 732 of each connector are connected to the common bus 730 through the appropriate passive or active components 740 and bus 732.

In one embodiment, passive components 740 are used to provide sufficient isolation from the common bus 730 so that the bus may meet Fibre Channel requirements despite the failure of one or more devices. The values and configuration of the passive components depend upon whether the signal line is specified to have a pull up resistor or not. Alternatively, active circuitry such as transistors and operational amplifiers may be used instead of passive components to achieve sufficient isolation.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A backplane apparatus comprising:
   a common bus comprising a plurality of signal lines, each signal line of the common bus having a current limiting element of impedance RA d.c. coupled to a first supply level; and
   isolation circuitry for electrically coupling each of the plurality of signal lines of the common bus to a corresponding plurality of signal lines of an electronic device to enable communication between the common bus and the electronic device through the isolation circuitry, the isolation circuitry having an impedance RD, wherein (RA+RD)≧3.3KΩ, wherein RD≦25KΩ.

2. The apparatus of claim 1 further comprising:
   a connector for removably coupling the plurality of signal lines of the electronic device to the plurality of signal lines of the common bus through the isolation circuitry.

3. The apparatus of claim 1 wherein the isolation circuitry for each signal line comprises an inline resistor having an impedance of RD.

4. The apparatus of claim 1 wherein RD has a value in a range of approximately 1 KΩ to 25 KΩ.

5. The apparatus of claim 1 wherein a first terminal of the current limiting element is coupled to the first supply level, wherein the apparatus further comprises switching circuitry, wherein the switching circuitry selectively couples a second terminal of the current limiting element to a second supply level.

6. The apparatus of claim 1 wherein RA is in a range of 10 Ω to 5 KΩ.

7. The apparatus of claim 1 wherein the isolation circuitry comprises passive components.

8. The apparatus of claim 1 wherein the isolation circuitry comprises active components.

9. The apparatus of claim 1 wherein the electronic device is a disk drive.

10. A backplane apparatus comprising:
    a common bus comprising a plurality of signal lines, each signal line having first terminal of an associated first current limiting element d.c. coupled to a first supply level, the first current limiting element of impedance RA;
    isolation circuitry electrically coupling each of the plurality of signal lines of the common bus to a plurality of electronic devices, each device having a corresponding plurality of signal lines to enable communication of signals between the common bus and the plurality of electronic devices; and
    switching circuitry for each signal line of the common bus, wherein each switching circuitry selectively couples a second terminal of the associated first current limiting element to a second supply level to select a logic level of the associated signal line.

11. The apparatus of claim 10 further comprising:
    a plurality of connectors for removably coupling the plurality of signal lines of each electronic device to the corresponding plurality of signal lines of the common bus through the isolation circuitry.

12. The apparatus of claim 10 wherein the isolation circuitry is passive isolation circuitry.

13. The apparatus of claim 12 wherein the isolation circuitry is an inline resistor of impedance RD in a range of 1 KΩ to 25 KΩ.

14. The apparatus of claim 12 wherein the isolation circuitry is an inline resistor of impedance RD in conjunction with a pull up resistor, wherein RD is less than 1 KΩ.

15. The apparatus of claim 10 wherein the isolation circuitry is active isolation circuitry.

16. The apparatus of claim 10 wherein RA for each selected signal line of the common bus is selected to have a value in a range of 10 Ω to 5 KΩ.

17. The apparatus of claim 10 wherein the electronic devices include disk drives.

* * * * *

UNITED STATES PATENT AND TRADEMARK OFFICE
CERTIFICATE OF CORRECTION

PATENT NO. : 6,910,089 B2 Page 1 of 1
APPLICATION NO. : 09/872924
DATED : June 21, 2005
INVENTOR(S) : James J. deBlanc et al.

It is certified that error appears in the above-identified patent and that said Letters Patent is hereby corrected as shown below:

In column 4, line 58, delete "RE." and insert -- RF. --, therefor.

In column 6, line 37, delete "RD=396Ω" and insert -- RD ≈ 396Ω --, therefor.

Signed and Sealed this

Eleventh Day of August, 2009

David J. Kappos
*Director of the United States Patent and Trademark Office*